United States Patent [19]

Ferguson

[11] Patent Number: 4,937,437

[45] Date of Patent: Jun. 26, 1990

[54] SECURITY SYSTEM FOR ELECTRONIC EQUIPMENT

[76] Inventor: Terry T. Ferguson, 6376 Yates Ford Rd., Manassas, Va. 22111

[21] Appl. No.: 15,578

[22] Filed: Feb. 18, 1987

Related U.S. Application Data

[63] Continuation of Ser. No. 640,901, Aug. 15, 1984, abandoned, which is a continuation of Ser. No. 390,647, Jun. 21, 1982, abandoned.

[51] Int. Cl.⁵ .......... G06K 5/00

[52] U.S. Cl. .......... 235/382; 235/441; 235/492; 340/825.31

[58] Field of Search .......... 235/382, 441, 492

[56] References Cited

U.S. PATENT DOCUMENTS

| | | | |
|---|---|---|---|
| 3,641,498 | 2/1972 | Hedin | 235/382 X |
| 3,761,892 | 9/1973 | Bosnyak et al. | 235/382 |
| 4,297,569 | 10/1981 | Flies | 235/443 |
| 4,326,125 | 4/1982 | Flies | 235/443 |
| 4,379,966 | 4/1983 | Flies | 235/443 |
| 4,436,993 | 3/1984 | Flies | 235/382 |
| 4,502,130 | 2/1985 | Kuckuk | 365/52 |
| 4,522,456 | 6/1985 | Wehrmacher | 339/17 R |
| 4,549,076 | 10/1985 | Flies | 235/382 |
| 4,578,573 | 3/1986 | Flies et al. | 235/492 |

*Primary Examiner*—David L. Trafton
*Attorney, Agent, or Firm*—Beveridge, DeGrandi & Weilacher

[57] ABSTRACT

A security system is provided for controlling access to information stored in a target memory in which an access key carries a random access binary memory which is electronically programmable, electronically alterable, directly electronically readable and non-volatile. The memory carried on the key constitutes an integral portion of the target system memory when the key is inserted into a receptacle. The receptacle has a zero insertion force socket to reduce wear and provide direct electrical connection. The key may have an extremely wide variety of coded information programmed into it; when the key is removed from the receptacle, the target system will not operate correctly since a portion of its memory is effectively missing. The system may be retrofitted into existing target systems or incorporated in future target systems.

19 Claims, 3 Drawing Sheets

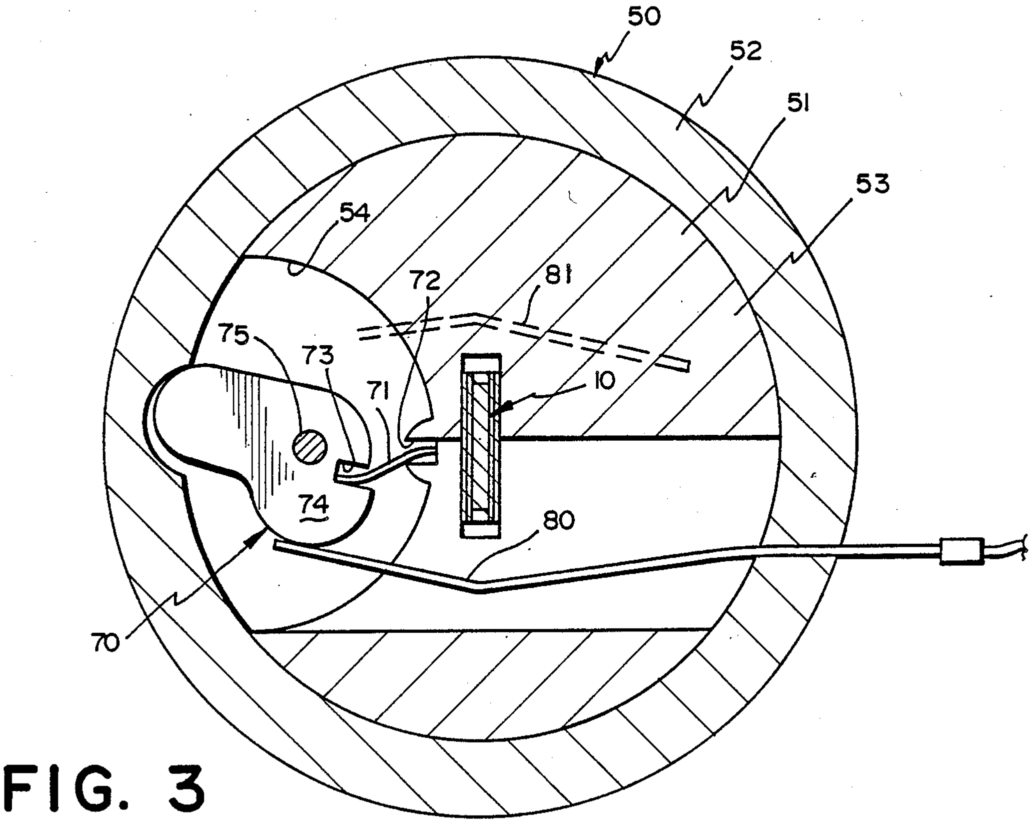
FIG. 3
FIG. 4
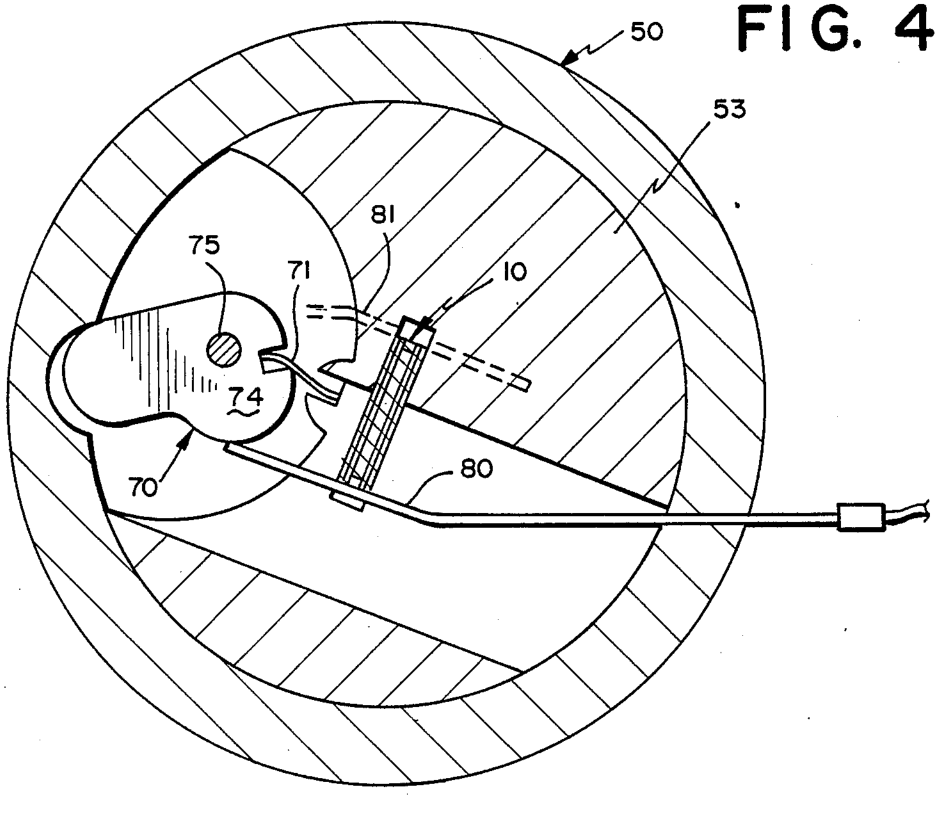

SECURITY SYSTEM FOR ELECTRONIC EQUIPMENT

This application is a continuation of application Ser. No. 06/604,901 filed August 15, 1984, now abandoned, which was a continuation of application Ser. No. 06/390,647, filed June 21, 1982 now abandoned.

FIELD OF THE INVENTION

The invention relates to an apparatus to restrict and to control access to sensitive information typically stored in computer memory. The invention incorporates a key and receptacle wherein the key contains a significant portion of the target system memory. When the key is removed from the socket, the target system is unable to operate correctly since a portion of its memory has been effectively removed.

BACKGROUND OF THE INVENTION

It is known in the art to provide various security systems for restricting and controlling access to sensitive information stored in electronic equipment.

One such example of prior art is the key apparatus of U.S. Pat. No. 4,298,792. In that system, which is typical of the prior art, the information required to open the lock is contained in a memory, for example a digital PROM located within the machine (see column 3, lines 4–6).

The key system of U.S. Pat. No. 4,200,227 generates a signal which, if recognized by the target system, authorizes access.

A generally similar system is shown in U.S. Pat. No. 4,120,452 in which a memory holder is inserted into the target system but in which the memory holder is primarily an accounting device. Removing the memory holder from the machine does not disable the target machine by removing a portion of the target system memory.

OBJECT AND SUMMARY OF THE INVENTION

It is a principal object of the present invention to provide a security system for information stored in a target system memory in which a portion of the target system memory is effectively removed between periods of authorized use. It is virtually impossible to gain unauthorized access to information in the target system during periods in which a portion of target system memory has been removed.

A further object of the invention is to provide a security system for restricting access to information stored in computer memory which can be retrofitted into an existing device having a prior art security system, without lessening the integrity of the original equipment.

A further object of the invention is to provide a very powerful security system in the form and appearance of an innocent, ordinary key and receptacle.

It is a further object of the invention to provide a key and receptacle in which there is very little, if any, physical wear and tear between the significant electrical contact points on the key and receptacle.

Another object of the invention is to provide a security system in which the key has relatively great lateral strength by being formed with a silicon substrate.

A further object of the invention is to provide an exceptionally fast operational read access time.

A further object of the invention is to incorporate a standard, general industry available, random access binary memory on a key which is electronically programmable, electronically alterable, directly electronically readable and non-volatile.

A further object of the invention is to provide a security system capable of emulating existing electronic memories to facilitate the retrofitting of existing security systems with the security system of the present invention.

A further object of the invention is to provide a security system which protects against surreptitious electronic intercept of sensitive information contained within said key.

A further object of the invention is to provide a security device in which the access key contains a very large data storage capability.

A further object is to provide a security system which is protected against static electricity.

The invention will be better understood, as well as further objects and advantages become more apparent, from the ensuing detailed description of preferred embodiments taken in conjunction with the drawings.

BRIEF DESCRIPTION OF THE DRAWINGS

FIG. 3 is a sectional view of the interior of the receptacle;

FIG. 4 is a sectional view of the receptacle of FIG. 3 shown in its alternate position.

DETAILED DESCRIPTION OF THE PREFERRED EMBODIMENTS

Figures 1, 2:
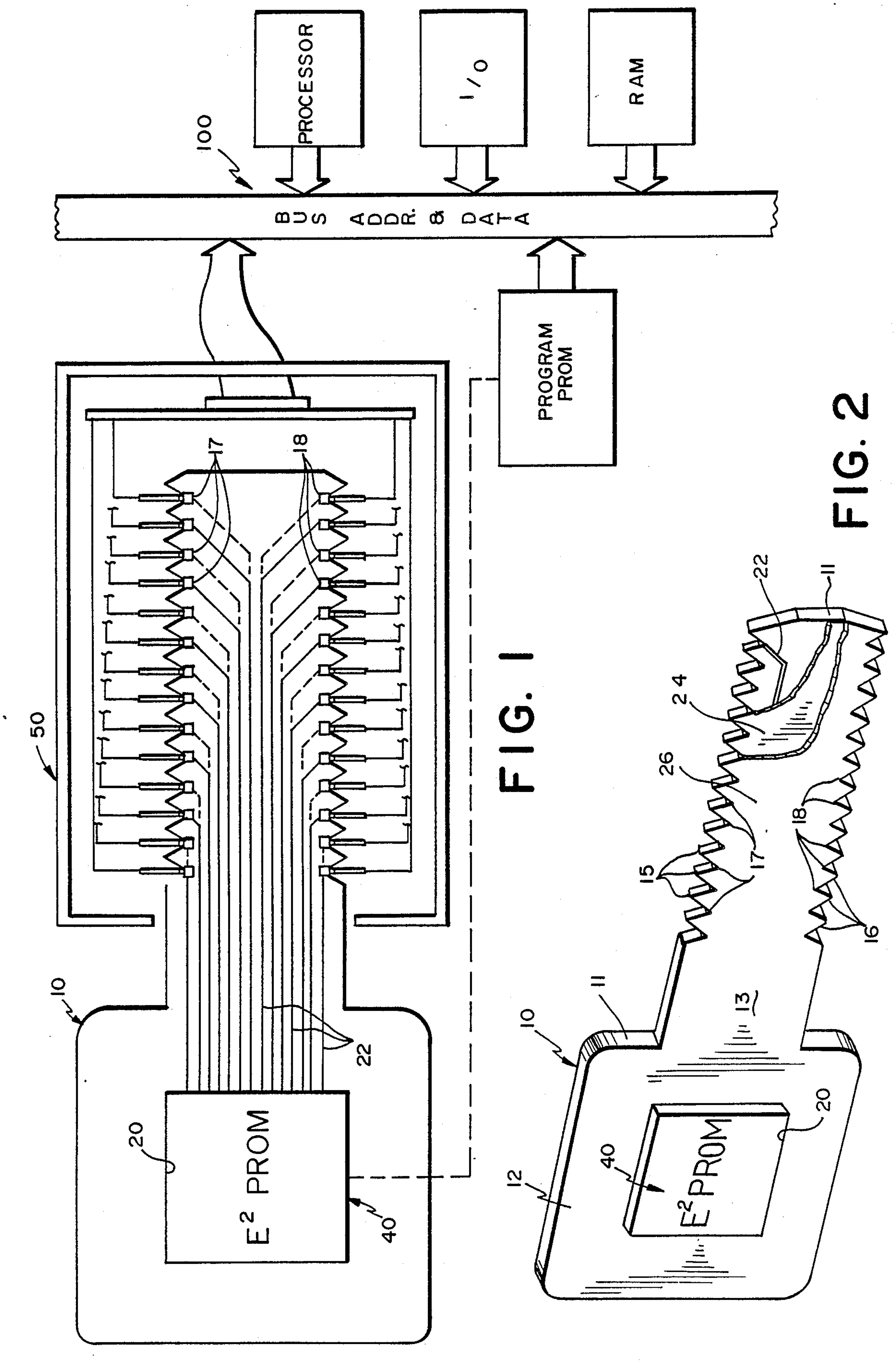
FIG. 1 is a schematic representation of the security system showing the key and its receptacle.
FIG. 2 is a perspective view of the key shown apart from the receptacle.

FIGS. 1 and 2 illustrate the key means shown generally as 10, receptacle means 50 and the target system 100. An important feature of the invention is that key means 10 carries a random direct access binary memory means 40 which is electronically programmable, electronically alterable, electronically readable and non-volatile ($E^2$PROM). A Hitachi HN 48016 may be used as memory means 40. Memory means 40 constitutes an integral portion of the target system memory when key means 10 is inserted into receptacle means 50. When the key means 10 is removed from the receptacle means 50, target system 100 will not operate correctly since a large portion of its memory is effectively missing.

Referring to FIG. 2, key means 10 comprises a ceramic substrate 11 formed generally in the shape of an ordinary key with a head 12 and a notched shaft 13. As shown in FIG. 2, the key means 10 contains notches 15 and 16 formed on both edges of shaft 13. It is to be understood that the key could be made with notches on one edge of shaft 13 but not on the opposite edge.

Conductive contact points 17 and 18 are placed in the base of notches 15 and 16 respectively. Recess 20 is formed in the head portion 12 to receive the random access binary memory means 40. Conductive traces 22 connect contact points 17 and 18 with recess 20.

A porcelain layer 24 is applied over the ceramic substrate 11 except at contact points 17 and 18. A metallic plating 26 is applied over the porcelain layer 24 and gives the key means 10 the appearance of an ordinary metallic key. The metallic layer 26 additionally keeps problems of static electricity to a minimum.

Key means 10 effectively allows critical parameters normally in PROM or ROM firmware to be in an easily removable, easily installed, controlled and transported data storage media which actually appears to have the function of a common key. The key means 10, in effect, replaces the internal PROMs now in use. Data is electronically read by the host at the host's speed, up to 400 nanoseconds; the key means 10 literally and actually is presented to the host or target system as the target's own internal PROM memory. The key means 10 is reprogrammable with the programmer; the key contains 16,384 bits of information through hybrid technology, which is capable of emulating any type of PROM up to 16,384 bits. With normal usage, the memory means 40 has a tolerance of $10^9$ read accesses between writes and $10^6$ erase/write cycles. Data stored in memory means 40 may be written, read, or updated in whole or in part when the key is inserted into receptacle means 50. The overall design of the key means 10 and receptacle means 50 prevents EMI/RFI radiation of the data within the key during operation to minimize electronic radiation as required by FCC and VDE specifications and to conform to government TEMPEST standards.

The storage capacity of memory means 40 of 16,384 reprogrammable bits provides $2^{16384}$ possible combinations. Even if an unauthorized person were to obtain a key and try various combinations on a terminal designed or modified for use with the system of this invention; even if the change and try of combinations, response, acceptance or rejection occurs one million times per second, it would still take over $10^{2000}$ years (average) just to gain access. The key means 10 contains very large personalized individual codes (50 to 100 characters) which upon computer or terminal match allows access to the main system. The key can also contain a significant portion of the terminal firmware, without which not even the terminal will operate properly.

Consider if the key means 10 were lost or duplicated. If lost, the key means 10 does have some valid code—but the finder would have no way of knowing to what terminal the key would apply. The issuing organization simply reprograms a new key, changes the terminal or CPU access codes to unused combinations, and forgets the lost key.

FIGS. 3 and 4 show receptacle means 50. A "zero insertion force socket" 51 is formed by cylinder 52 and recessed barrel 53. An arcuate recess 54 is formed in barrel 53 to allow for the operation of cam means 70. Upon rotation of the key in the clockwise direction as shown in FIG. 4, barrel 53 is rotated as shown. Cam means 70 moves in response to rotation of barrel 53. Leaf spring 71 is mounted between recess 72 in barrel 53 and recess 73 formed in cam 74. As cam 74 rotates about its mounting shaft 75 spring loaded electrical contact 80, which rides on cam 74, is brought into contact with key means 10 as shown in FIG. 4. This design effectively eliminates wear of the electrical contacts 80 and electrical contact points 17 and 18 on key means 10. FIG. 4 shows in phantom an additional spring loaded contact 81 which is utilized if key means 10 is designed to have contact points on both edges of shaft 13. (Please see FIG. 2.)

Figure 5:
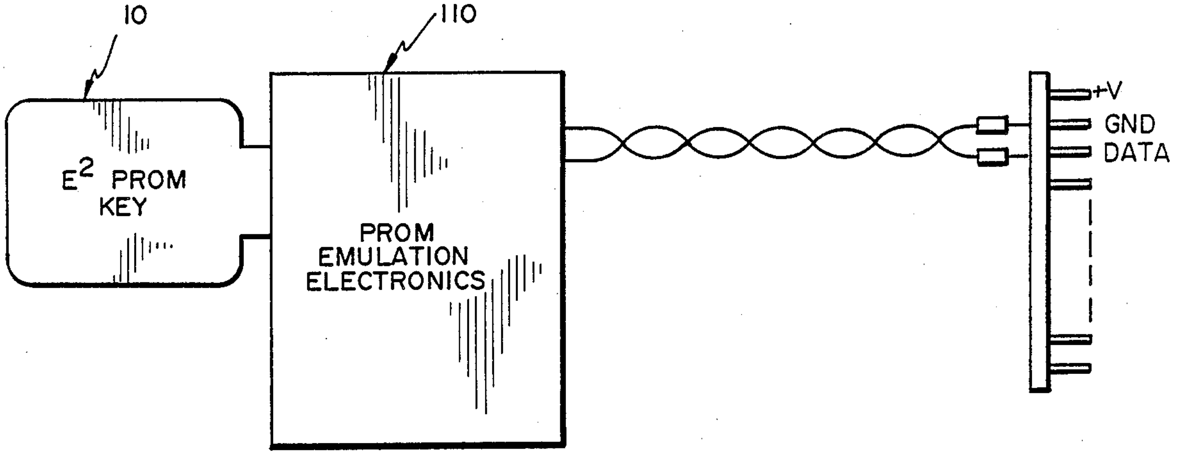
FIG. 5 is a schematic representation of the emulation electronics of the present system.

FIG. 5 shows schematically the emulation means 110. The use of emulation means 110 allows existing systems to be retrofitted with the system of this invention. As represented in FIG. 5, key means 10 (shown as "$E^2$-PROM key") is electrically programmed with the identical data as in an existing PROM. The PROM emulation electronics logic array converts the address area of the EPROM to the $E^2$PROM and, when read, operates in reverse. Due to the large data capacity of the key means 10, any known 16k bit or less EPROM or ROM may be emulated, often simply by making the appropriate cross-wire interconnects. Thus, address bit 1 of the EPROM socket is wired to address bit 1 of the key means 10. Address wiring is similarly accomplished for bit 2 to address bit 2, etc. The same occurs with the data bits. Unused address bits are tied off to the appropriate logic level. Power and ground is also taken from the host to the key means.

In a transliteration code, the bit representation of ASCII letter A is mapped through the EPROM which may put out another bit pattern, say the ASCII letter Y. This is accomplished through a look-up table, adds, compares, subtracts, etc. In any case, a bit (or series of bits) is read from an addressed memory cell where the address of the cell depends upon what bit pattern has arrived to be translated.

All the security key does is to remote the above function. This is similar to extending a computer bus by cable.

I claim:

1. A computer security device, comprising, means for controlling access to information stored in a target computer system memory which has a data and address bus, said means including a key means which has the form of an ordinary key which has a flat head connected to a flat shaft, said flat shaft having notches formed along at least one edge thereof, said key means being directly connectable electronically to the data and address bus of the target computer system, receptacle means receiving said key means, random access binary memory means carried by said key means, said random access binary memory means being electronically programmable, electronically alterable when connected directly to a target computer system, directly electronically readable when connected directly to a target computer system, non-volatile, and constituting an essential and integral portion of the target computer system memory when said key means is inserted into said receptacle means;

said key means being removable from the receptacle for preventing the target computer system from operating correctly as a portion of memory is missing therefrom.

2. The device of claim 1 wherein said key means comprises:

a ceramic substrate formed with a head and a notched shaft, a plurality of conductive contact points in the notches on said shaft, a recess formed in said head to receive said random access binary memory means, conductive traces connecting said contact points to said random access binary memory means, and a porcelain layer overlying said key except at said contact points.

3. The device of claim 2 further comprising a conductive, metallic layer overlying said porcelain layer.

4. The device of claim 1 wherein said receptacle means comprises:

a zero insertion force socket, cam means carried in said socket which moves in response to rotation of said key means in said socket, and spring loaded electrical contacts which ride on said cam means such that as said cam means is rotated, said spring loaded electrical contacts are brought into contact with said key means.

5. The device of claim 1 further comprising:

emulation means electrically connected to said receptacle means for emulating electronic memories of existing machines such that an existing machine may be retrofitted with the security device herein described.

6. The device of claim 1 wherein the key means includes an electrically insulative substrate and a metallic outer layer which provides protection from static electricity.

7. The device of claim 1 in combination with a computer system, said computer system having a memory, an integral portion of which is said random access binary memory means carried by said key means.

8. A computer system, comprising, a memory which includes an essential and indispensible memory portion which is essential for the correct operation of the computer system, a data and address bus connected to the memory of the computer system, said essential and indispensible memory portion being carried by a key member which has the appearance of an ordinary key, said key member having a flat head, a flat shaft extending from the flat head, and notches formed in at least one edge of the flat shaft, said key being directly connectable electronically to the computer system as a portion of said memory, said essential and indispensible memory portion carried by the key member being a random access binary memory which is electronically programmable, electronically alterable when connected directly in the memory of the computer system, directly electronically readable when connected directly in the memory of the computer system, and non-volatile, a receptacle means connected to the computer system and being operable to receive the shaft of said key member to connect the essential and indispensible memory portion carried by the key member directly to the computer memory via the data and address bus, said key member being removable from the receptacle means to disable the computer system by removing said essential and indispensable portion of its memory.

9. A computer system according to claim 8 wherein the key member is formed of a ceramic substrate, a recess formed in the head of the key member, said indispensible memory portion being located in said head, electrical contact points located on said shaft, a plurality of electrical conductive traces extending from said indispensible memory portion to said electrical contact points, and an electrically insulative layer overlying said key except at said contact points.

10. A computer system according to claim 9 wherein the key member has a conductive metallic layer overlying said insulative layer.

11. A computer system according to claim 9 wherein the receptacle means has a rotatable socket for receiving the shaft of the key member, said receptacle means having a plurality of electrical contacts for engaging the electrical contact points on the key member, cam means on said socket for radially moving the electrical contacts in the receptacle into contact with the contact points on the key member in response to rotation of the socket.

12. A computer security device, comprising, means for controlling access to information stored in a target computer system memory, said means including a key means which has the form of an ordinary key which has a flat head connected to a flat shaft, said flat shaft having notches formed along at least one edge thereof, said key means being directly connectable electronically to a target computer system, receptacle means receiving said key means, random access binary memory means carried by said key means, said random access binary memory means being electronically programmable, electronically alterable when connected directly to a target computer system, directly electronically readable when connected directly to a target computer system, non-volatile, and constituting an integral portion of the target computer system memory when said key means is inserted into said receptacle means;

said key means being removable from the receptacle for preventing the target computer system from operating correctly as a portion of memory is missing therefrom;

said key means comprising:

a ceramic substrate formed with a head and a notched shaft, a plurality of conductive contact points in the notches on said shaft, a recess formed in said head to receive said random access binary memory mean, conductive traces connecting said contact points to said random access binary memory means, and a porcelain layer overlying said key except at said contact points.

13. The device of claim 12 further comprising a conductive, metallic layer overlying said porcelain layer.

14. A computer security device, comprising, means for controlling access to information stored in a target computer system memory, said means including key means which has the form of an ordinary key which has a flat head connected to a flat shaft, said flat shaft having notches formed along at least one edge thereof, said key means being directly connectable electronically to a target computer system, receptacle means receiving said key means, random access binary memory means carried by said key means, said random access binary memory means being electronically programmable, electronically alterable when connected directly to a target computer system, directly electronically readable when connected directly to a target computer system, non-volatile, and constituting an integral portion of the target computer system memory when said key means is inserted into said receptacle means;

said key means being removable from the receptacle for preventing the target computer system from operating correctly as a portion of memory is missing therefrom; said key means including an electrically insulative substrate and a metallic outer layer which provides protection from static electricity.

15. A computer system, comprising, a memory which includes an indispensible memory portion which is essential for the correct operation of the computer system, said indispensible memory portion being carried by a key member which has the appearance of an ordinary key, said key member having a flat head, a flat shaft extending from the flat head, and notches formed in at least one edge of the flat shaft, said key being directly connectable electronically to the computer system as a portion of said memory.

said indispensible memory portion carried by the key member being a random access binary memory which is electronically programmable, electronically alterable when connected directly in the memory of the computer system, directly electronically readable and non-volatile, a receptacle means connected to the computer system and being operable to receive the shaft of said key member to connect the indispensible memory portion carried by the key member to the computer memory, said key member being removable from the receptacle means to disable the computer system by removing said indispensable portion of its memory, said key member being formed of a ceramic substrate, a recess formed in the head of the key member, said indispensible memory portion being located in said head, electrical contact points located on said shaft, a plurality of electrical conductive traces extending from said indispensible memory portions to said electrical contact points, and an electrically insulative layer overlying said key except at said contact points.

16. A computer system according to claim 15 wherein the key member has a conductive metallic layer overlying said insulative layer.

17. A computer system according to claim 15 wherein the receptacle means has a rotatable socket for receiving the shaft of the key member, said receptacle means having a plurality of electrical contacts for engaging the electrical contact points on the key member, cam means on said socket for radially moving the electrical contacts in the receptacle into contact with the contact points on the key member in response to rotation of the socket.

18. The device of claim 1 wherein said receptacle means includes a zero insertion force socket provided with spring loaded electrical contacts for making electrical contact with said key means.

19. The device of claim 8 wherein said receptacle means includes a zero insertion force socket provided with spring loaded electrical contacts for making electrical contact with said key member.

* * * * *